(12) United States Patent
Suzuki et al.

(10) Patent No.: US 6,362,938 B1
(45) Date of Patent: Mar. 26, 2002

(54) FINE DRIVE AND POSITIONING UNITS AND MEMORY APPARATUS

(75) Inventors: Yoko Suzuki; Kazuo Tani; Hidetaka Maeda; Mizuaki Suzuki, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/404,937

(22) Filed: Sep. 23, 1999

(30) Foreign Application Priority Data

Jun. 24, 1998 (JP) .......................... 10-270198

(51) Int. Cl.$^7$ .................... G11B 21/24; G11B 5/56; G11B 21/16; G11B 5/48
(52) U.S. Cl. ................... 360/294.4; 360/244.2
(58) Field of Search .............. 360/254, 254.1, 360/254.2, 264, 264.1, 265.9, 270, 274, 294, 294.4, 294.1, 294.7, 244, 244.2, 244.8, 77.16, 78.12

(56) References Cited

U.S. PATENT DOCUMENTS

| | | | | |
|---|---|---|---|---|
| 4,740,854 A | * | 4/1988 | Shibuya et al. | 360/246.4 |
| 5,307,311 A | * | 4/1994 | Sliwa, Jr. | 365/174 |
| 5,847,902 A | * | 12/1998 | Clifford, Jr. et al. | 360/245.6 |
| 6,046,888 A | * | 4/2000 | Krinke et al. | 360/294.4 |
| 6,046,889 A | * | 4/2000 | Berding et al. | 360/265.7 |
| 6,069,771 A | * | 5/2000 | Boutaghou et al. | 360/294.4 |
| 6,157,522 A | * | 12/2000 | Murphy et al. | 360/294.6 |
| 6,188,548 B1 | * | 2/2001 | Khan et al. | 360/294.4 |
| 6,233,124 B1 | * | 5/2001 | Budde et al. | 360/294.4 |

* cited by examiner

Primary Examiner—Hoa T. Nguyen
Assistant Examiner—Julie Anne Watko
(74) Attorney, Agent, or Firm—Adams & Wilks (57) ABSTRACT

A fine drive unit comprises a suspension arm having a head portion and a support member supporting the suspension arm for undergoing pivotal movement. The support member has a coupling portion connected to the suspension arm, a spring portion connected to the coupling portion, at least one pair of bi-directional cantilevers, and piezoelectric members each disposed on a respective one of the cantilevers. When a voltage having a preselected frequency is applied to the piezoelectric members, the cantilevers are vibrated to cause the cantilevers to contact the suspension arm and thereby finely drive the head portion.

14 Claims, 13 Drawing Sheets

FINE DRIVE AND POSITIONING UNITS AND MEMORY APPARATUS

BACKGROUND OF THE INVENTION

This invention relates to fine drive and positioning units and a memory apparatus and more particularly, to fine drive and positioning units and memory apparatus which can realize high speed, high resolution access while being suited for mass production.

Figure 14:
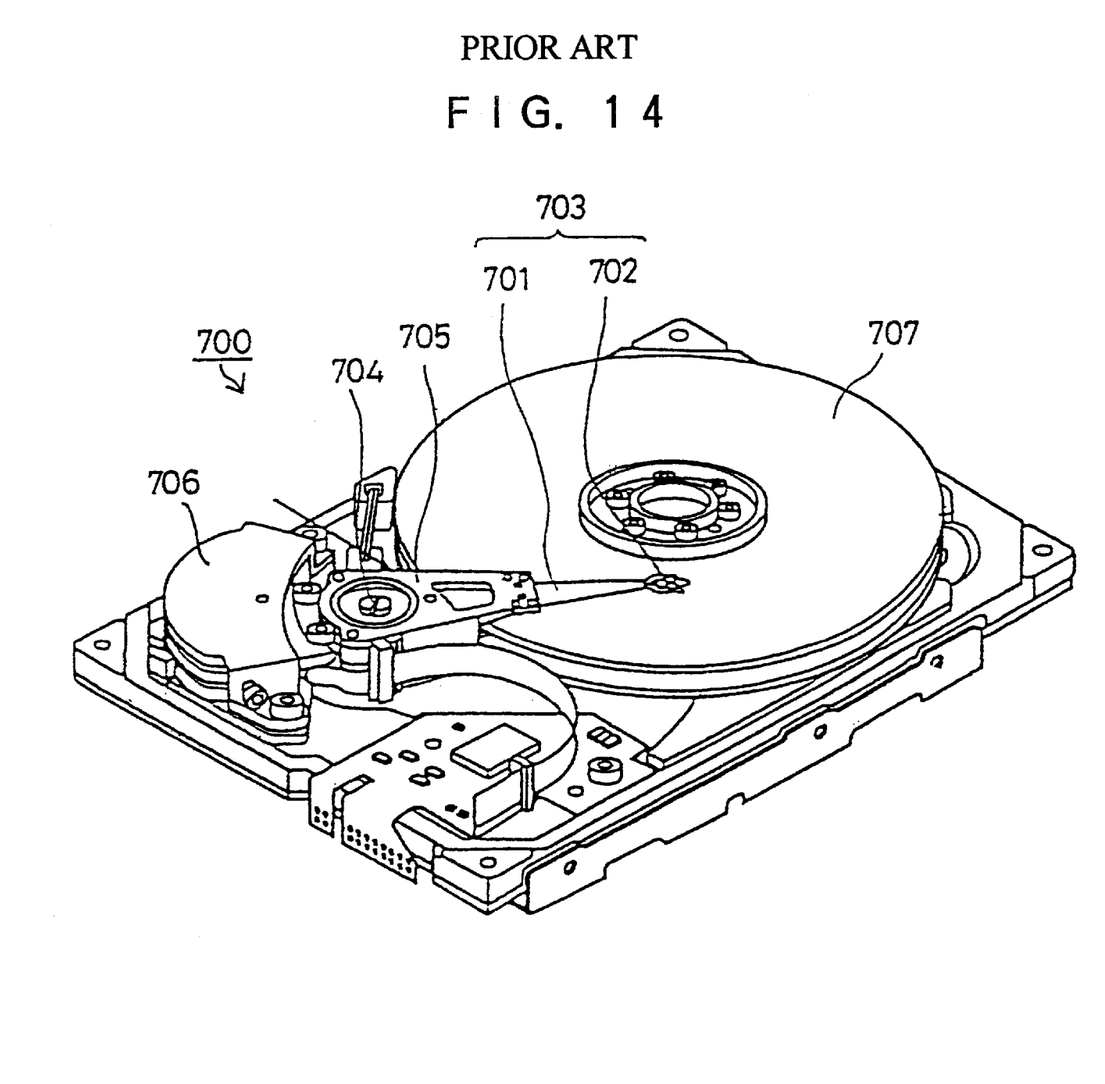
FIG. 14 is a perspective view showing one example of a related art magnetic disc apparatus.

The related art memory apparatuses includes, for example, a magnetic disc apparatus 700 as shown in FIG. 14. This apparatus has a floating head mechanism 703 having a magnetic head 702 provided at a tip of a suspension arm 701, a carriage 705 supported on a swing shaft 704 and mounted with the floating head mechanism 703, and a voice coil motor 706 provided on an opposite side to the magnetic head 702. The energization to the voice coil motor 706 causes the magnetic head 702 to swing about the swing shaft 704. The magnetic head 702 floats over the rotating magnetic disc 707.

Present memory apparatuses are rapidly increasing in recording density per unit area. The yearly increase of recording density so far has been approximately 25%. In recent years, however, it has reached as high as around 60%. Due to this, there is a demand for a head positioning mechanism that is capable of accessing at high speed and with high resolution. For such demand, technologies have been developed that include, for example, two voice coil motors for reducing the force of translation acted on a swing shaft and a two-staged actuator for providing rough and fine movements.

In the related art memory apparatus 700 shown in FIG. 14, however, there has been a problem in realizing high speed, high resolution access because the entire apparatus is vibrated due to a seek reaction force, thus increasing seek time. Meanwhile, it is a general practice to use a memory apparatus by switching over between seek and following control systems, in order to realize high speed seek and accurate track following. However, the switching between the control systems has posed a problem of time loss due to prolonged positioning time.

Meanwhile, in order to solve the above problem, a piggyback type magnetic disc has been proposed which is arranged with a voice coil motor between a suspension arm and a carriage (International Conference on Micromechatronics for Information and Precision Equipment, Tokyo, Jul. 20–23, 1997: MR-08 DEVELOPMENT OF INTEGRATED PIGGYBACK MILLI-ACTUATOR FOR HIGH DENSITY MAGNETIC RECORDING: Shinji KOGANEZAWA, etc., FUJITSU LIMITED).

Figure 15:
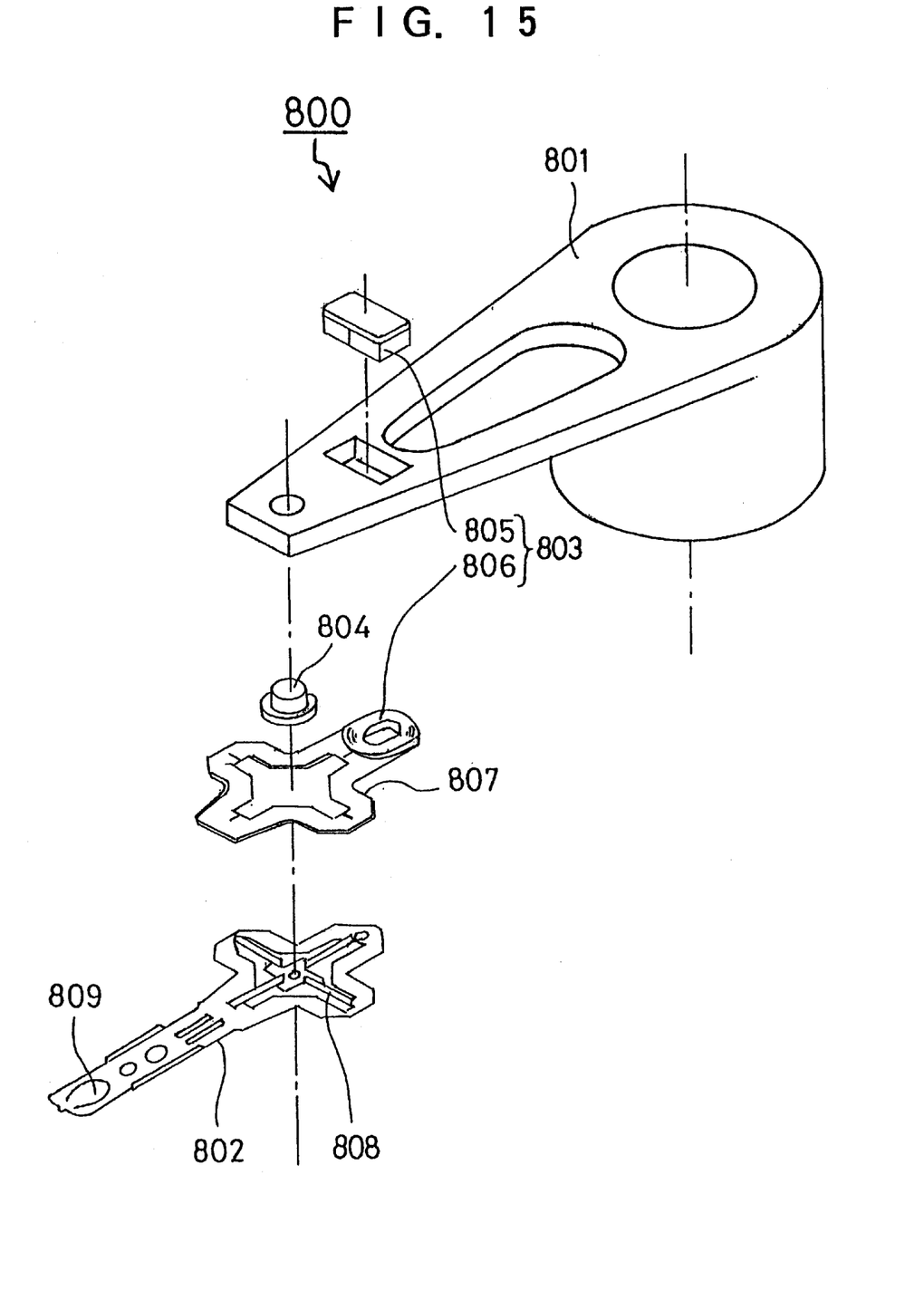
FIG. 15 is a perspective view showing another example of a related art magnetic disc.

The structure of this magnetic disc apparatus is shown in FIG. 15. This magnetic disc apparatus 800 is structured by a positioning voice coil motor 803 arranged between a carriage 801 and a suspension arm 802. The carriage 801 is mounted, at its one end, with a stator shaft 804. Also, the carriage 801 is fixed with a magnet 805. Furthermore, a coil 806 is provided opposite to this magnet 805. The coil 806 is fixed on a head mounting block 807. The head mounting block 807 is fixed on a cross shaped spring 808 of the suspension arm 802. The cross shaped spring 808 is fabricated from an extremely thin steel sheet. Meanwhile, the cross shaped spring 808 at its center is spot-welded with the stator shaft 804. At a tip of the suspension arm 802, a gimbal 809 is formed. A slider (not shown) provided with a magnetic head is attached to an underside of the gimbal 809. This magnetic disc apparatus 800 realizes seek time reduction due to short seek operation by the voice coil motor 803.

However, there is a problem that this magnetic disc apparatus 800 requires an increased number of complicated and delicate parts and is thus not suited for mass production. Furthermore, because in the magnetic disc apparatus 800 the head mounting block 807 and the suspension arm 802 are made as movable parts, there is an increase in mass resulting in an increase of a seek reaction force. As a result, there has been a problem with limitation in seek time reduction.

SUMMARY OF THE INVENTION

It is therefore an object of the present invention to provide a memory apparatus and fine positioning unit which is capable of realizing access at high speed and with high resolution and which is suited for mass production.

A first fine drive unit in accordance with the present invention in order to achieve the above mentioned object, comprises: a suspension arm for supporting a head portion formed on a slider; a rotation support portion for supporting one portion of the suspension arm and allowing the suspension arm to swing about the support portion; a support member arranged opposite to the suspension arm; a coupling portion provided on the support member and coupled to the suspension arm; a spring portion provided between the support member and the coupling portion; a fine head drive section having bi-directional cantilevers each having one fixed end and the other free end formed on the support member and piezoelectric members respectively provided on the cantilevers; and wherein the cantilevers are vibrated by applying a particular frequency of voltage to the piezoelectric members to cause the cantilevers to contact with the suspension arm thereby finely drive the head portion.

The application of a particular frequency of voltage to the piezoelectric members causes the piezoelectric members to expand and contract thereby vibrating the cantilevers. The suspension arm arranged oppositely to the support member continuously contacts with the cantilevers due to the vibration of the cantilevers. The suspension arm is given a divisional force acted sideways due to contact of the cantilevers. The suspension arm is coupled to the support member through the coupling portion. Because the coupling portion is held by the spring portion, the spring portion is elastically deformed by the sideways divisional force, causing the suspension arm to swing. The head section is moved by the suspension arm swing. The cantilevers are bi-directionally provided and accordingly the head section is capable of moving in opposite directions. As will be referred to later, a piggyback schemed memory apparatus can be structured by mounting the fine drive unit on a carriage driven by a voice coil motor.

A second fine drive unit in accordance with the invention, comprises: a support portion formed integrally with a coupling portion in an island form, a spring portion connected to the coupling portion and bi-directional cantilevers each having one fixed end and the other free end, wherein piezoelectric members are provided respectively for the cantilevers, and a rotation support portion being provided to support one portion of the suspension arm to allow the suspension arm to swing about the support portion; a head section formed on a slider to record data to a memory medium and reproduce data recorded in the memory medium; a suspension arm arranged opposite to the support member and supporting the head section; and wherein the cantilevers are vibrated by applying a particular frequency of voltage to the piezoelectric members to cause the cantilevers to contact with the suspension arm thereby finely drive the head portion.

This fine drive unit is integrally formed with the coupling portion, spring portion and cantilevers of the support member so that the suspension arm is provided on the coupling portion, thus enabling batch process and reducing the number of parts. This is suited for mass production. Also, if the piezoelectric members or rotation support portion are integrally formed, the production process will be further simplified.

In this fine drive unit, the application of a particular frequency of voltage to the piezoelectric members causes the cantilevers to vibrate similarly to the above, thereby swing the suspension arm that is arranged opposite to the support member. The suspension arm is coupled to the support member through the coupling portion, and the coupling portion is held by the spring portion. Accordingly, the spring portion is elastically deformed by the sideways divisional force due to the cantilever. This makes it possible to swing the suspension arm.

A first fine positioning unit in accordance with the invention, comprises: a first fine drive unit; a carriage provided at one end of a support member forming the fine drive unit; a head drive section provided on the carriage to drive the head section by using a magnetic circuit and a coil; and wherein the head section is finely positioned by operation of the fine drive unit and the head drive section.

Also, a second fine positioning unit in accordance with the invention, comprises: a second fine drive unit; a carriage provided at one end of a support member forming the fine drive unit; a head drive section provided on the carriage to drive the head section by using a magnetic circuit and a coil; and wherein the head section is finely positioned by operation of the fine drive unit and the head drive section.

In the first and second fine positioning units, the head drive section uses a magnetic circuit and coil to drive the head section, thus being suited for large movement. The fine head drive section drives the head section through cantilever vibration and is accordingly suited for fine movement. The use of the head drive section and fine head drive section can efficiently effect fine positioning operation over a wide swing range. For example, large swing motion is performed by the head drive section while fine positioning operation is by the fine head drive section. Also, the head drive section and the fine head drive section may be used together. Furthermore, because two actuators for the head drive section and fine head drive section are used in control, there is no necessity of switching in control for between large swing motion and fine positioning operation. Also, because movable portion (suspension arm) can be reduced in mass, it is possible to suppress low the reaction force due to inertia during positioning. Furthermore, the comparatively simple structure is suited for mass production.

Meanwhile, in the second fine positioning unit, the coupling portion, spring portion and cantilevers of the support member are integrally formed to have a suspension arm on the coupling portion, making possible batch process and reduces the number of parts. This is suited for mass production. Also, if the piezoelectric members and the rotation support portion are integrally formed, the manufacture process can be further simplified.

A first memory apparatus in accordance with the invention, comprises: a first fine drive unit; a recording medium for recording data; and wherein data recorded in the memory medium is reproduced and data is recorded through the head section forming the fine drive unit.

Also, a second memory apparatus in accordance with the invention, comprises: a second fine positioning unit; a recording medium for recording data; and wherein data recorded in the memory medium is reproduced and data is recorded through the head section forming the fine drive unit.

The application of a particular frequency of voltage to the piezoelectric members causes the piezoelectric members to expand and contract, vibrating the cantilevers. The suspension arm arranged oppositely to the support member continuously contacts with the cantilevers due to the vibration of the cantilevers. The suspension arm is given a divisional force acted sideways due to the contact with the cantilevers. The suspension arm is coupled to the support member through the coupling portion. Because the coupling portion is held by the spring portion, the spring portion is elastically deformed by the sideways divisional force. This causes the suspension arm to swing. The head section is moved by the suspension arm swing. The cantilevers are bi-directionally provided and accordingly the head section is capable of moving in opposite directions. A piggyback schemed memory apparatus can be structured by mounting the fine positioning unit on a carriage driven by a voice coil motor.

The head drive section is suited for large movement because a magnetic circuit and coil are used to drive the head section. The fine head drive section is suited for fine movement because cantilever vibration drives the head section. The use of the head drive section and fine head drive section enables seek and following operations with efficiency. For example, seek operation is performed by the head drive section while following operation is by the fine head drive section. Also, the head drive section and the fine head drive section may be used together to carry out seek or following operation. Furthermore, because two actuators for the head drive section and fine head drive section are used in control, there is no necessity of switching between seek control and following control. Also, because the movable portion (suspension arm) can be reduced in mass, it is possible to suppress the seek reaction force low. Furthermore, an arm of a piggyback scheme can be structured by a comparatively simple structure, thus suited for mass production.

Meanwhile, in the second memory apparatus, the coupling portion, spring portion and cantilevers of the support member are integrally formed to have a suspension arm on the coupling portion, making possible batch process and reduces the number of parts. This is suited for mass production. Also, if the piezoelectric members and the rotation support portion are integrally formed, the manufacture process can be further simplified.

DETAILED DESCRIPTION OF THE PREFERRED EMBODIMENTS

Now the present invention will be described in detail with reference to the drawings. It should be noted that the invention is not limited to the embodiment described hereinunder.

Figure 1:
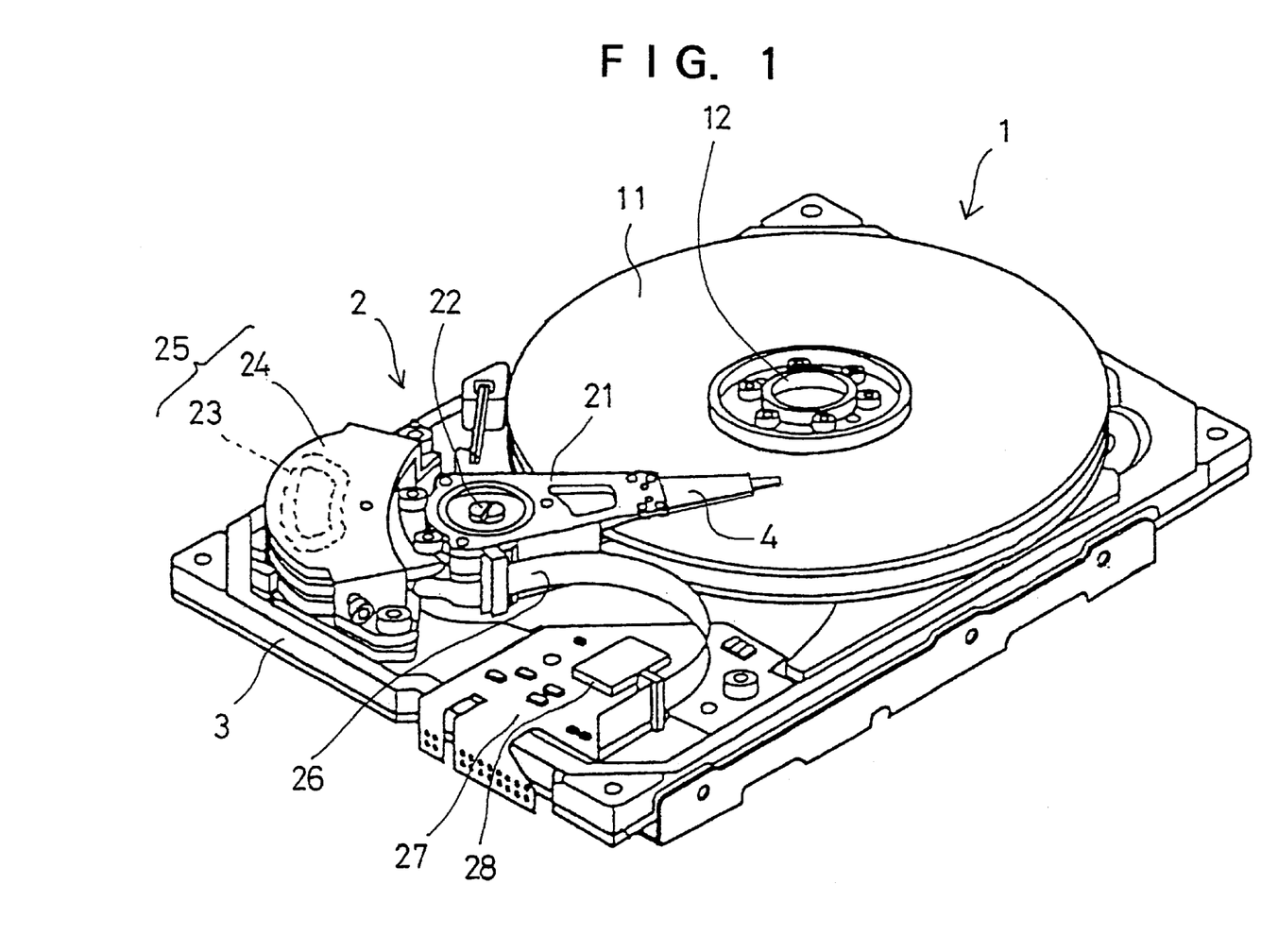
FIG. 1 is a perspective view showing a magnetic disc apparatus according to an embodiment of the invention.

Referring to FIG. 1, there is illustrated a perspective view showing a magnetic disc apparatus according to an embodiment of the invention. The disc apparatus includes a spindle mechanism 1 to rotate a magnetic disc and a positioning mechanism 2 to position a magnetic head. The spindle mechanism 1 and the positioning mechanism 2 are incorporated in a base 3.

The spindle mechanism 1 is structured to have a magnetic disc 11 bolted onto a rotation shaft 12 of a DC motor built in the base 3. The magnetic disc 11 may be structured having a magnetic recording layer by applying an oxide over a disc base member surface or by sputtering a magnetic material. The magnetic layer of the magnetic disc 11 is preferably formed thin with a homogeneous surface, is high in coercive force and is made of a magnetic material having a fine grain size.

A carriage 21 is rotatably supported on a swing shaft 22. The carriage 21 has a rotor 23 attached to an end portion thereof. The rotor 23, together with a stator 24 provided on a base 3 side, constitutes a voice coil motor 25. The rotor 23 is structured having movable coils bonded to upper and lower surfaces of a carriage plate. The stator 24 is structured by a permanent magnet and arranged in a manner sandwiching the rotor 23. Meanwhile, the movable coil is supplied by electric power by way of a flexible cable 26. The base 3 is provided with a circuit board 27 having a seek/following control section 28 formed on its circuit. The carriage 21 is further provided, at an end, with a fine positioning unit 4.

Figure 2:
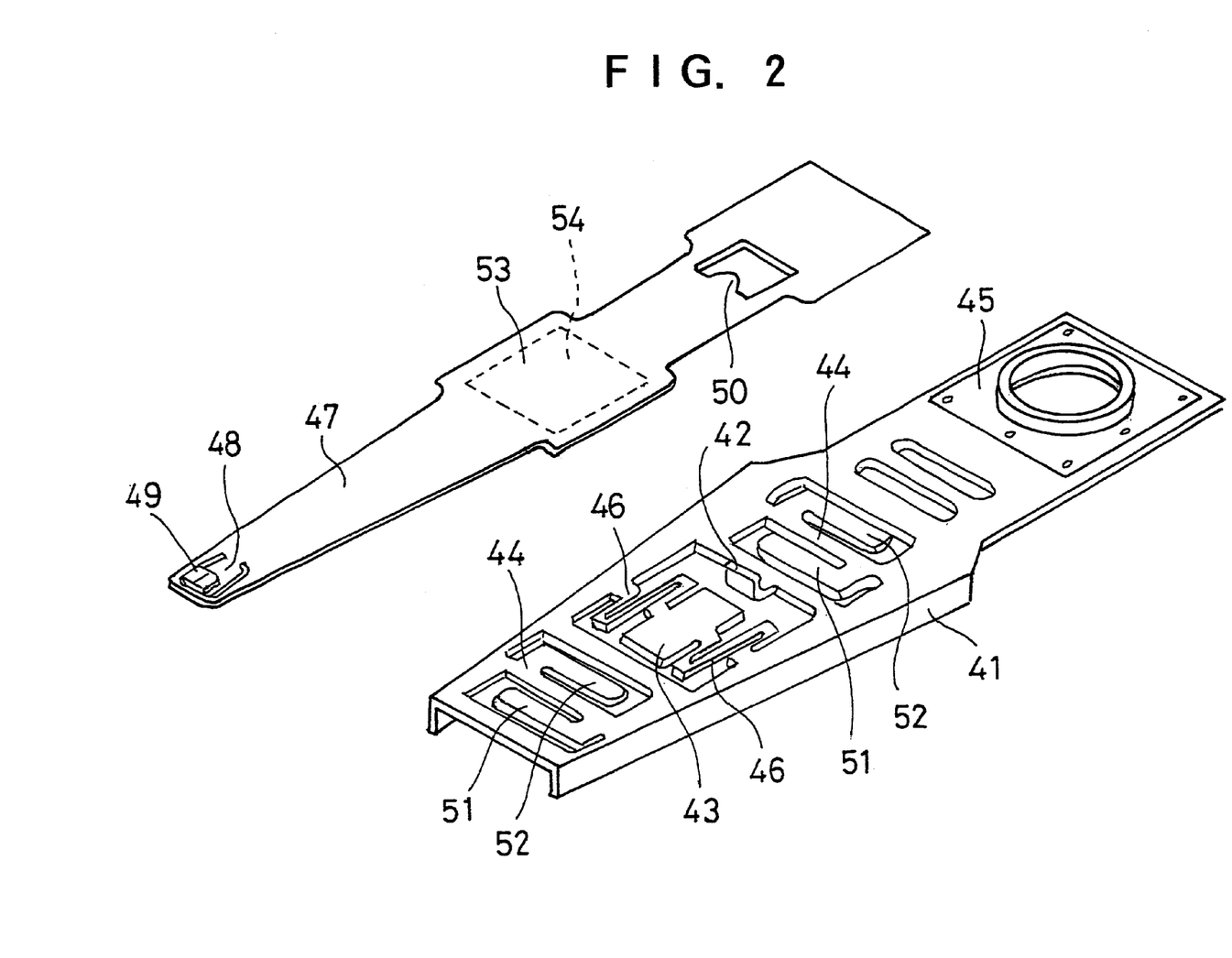
FIG. 2 is an assembly view showing part of a positioning mechanism shown in FIG. 1.

Referring to FIG. 2, illustrated is an assembly view showing one part of the fine positioning unit 4. The carriage 21 is fixed with a support member 41. The support member 41 is formed with a rotation support portion 42, a coupling portion 43, two sets of fine drive portions 44. On a support member end portion is fixed a mount plate 45 for connection to the carriage 21. The coupling portion 43 is supported through an S-formed spring portion 46 that is elastically deformable. The coupling portion 43 and spring portion 46 are formed utilizing a photo-fabrication technique such as etching. The use of a non-machining process eliminates deformation, strains and mechanical stresses to occur during forming, stabilizing functionality and reproducibility. A suspension arm 47 is joined to the coupling portion 43 by laser spot welding. The suspension arm 47 is formed, at a tip end, with a gimbal 48, and this gimbal 48 is attached with a slider 49. The slider 49 is formed with a magnetic head (not shown).

The magnetic head may use any of a ferrite head, MIG (Metal In Gap) head, thin film head, MR (Magneto Resistive) head and GMR (Giant Magneto Resistive) head. The GMR head is suited for high density recording. Incidentally, in place of a magnetic head, a head using near field light may be used.

Figure 3:
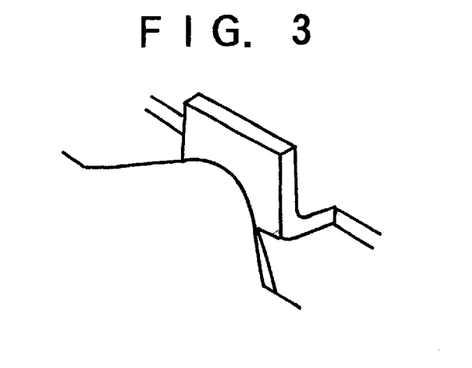
FIG. 3 is an explanatory view showing a relationship between projections and the rotation support portion.
Figure 4:
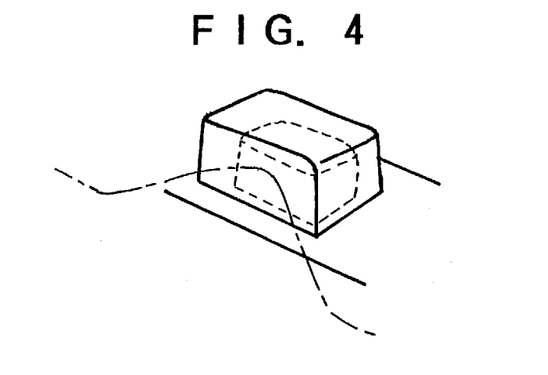
FIG. 4 is an explanatory view showing a modification to the projections.
Figure 5:
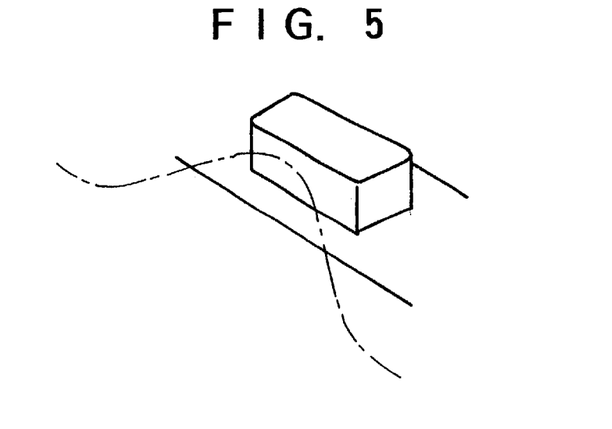
FIG. 5 is an explanatory view showing a modification to the projections.

The suspension arm 47 is formed with a projection 50 to serve as a rotation center. IN a state that the suspension arm 47 is coupled, the projection 50 abuts against the rotation support portion 42 to serve as a rotation center, as shown in FIG. 3, thereby allowing the suspension arm to undergo pivotal movement about the rotation support portion 42. The rotation support portion 42 is formed by bending after forming the support portion 41. Incidentally, the rotation support portion 42 may be a projection formed by embossing without bending, as shown in FIG. 4. Also, the projection may be formed in the process of fabrication, as shown in FIG. 5. In an alternative embodiment, the rotation support portion 42 and the projection 50 may be freely modified within a scope of design by a skilled person provided that they are in an engagement relationship.

The fine drive portion 44 is oppositely formed with cantilevers 51, 52 formed free at one end and fixed at the other end. The cantilevers 51, 52 are provided in a manner facing the suspension arm 47. Meanwhile, the suspension arm 47 is provided with a contact portion 53 in a position opposite to the cantilevers 51, 52. The contact portion 53 has a slide portion 54. The slide portion 54 uses a material high in frictional coefficient and excellent in abrasion resistance, for maintaining stable friction coefficient. For example, the slide portion 54 is subjected to oxide film treatment. Also, the slide portion 54 may use cellulose based fiber, carbon fiber, composite material of whisker and phenol resin, or composite material of polyimide resin and polyamide resin.

Figure 6:
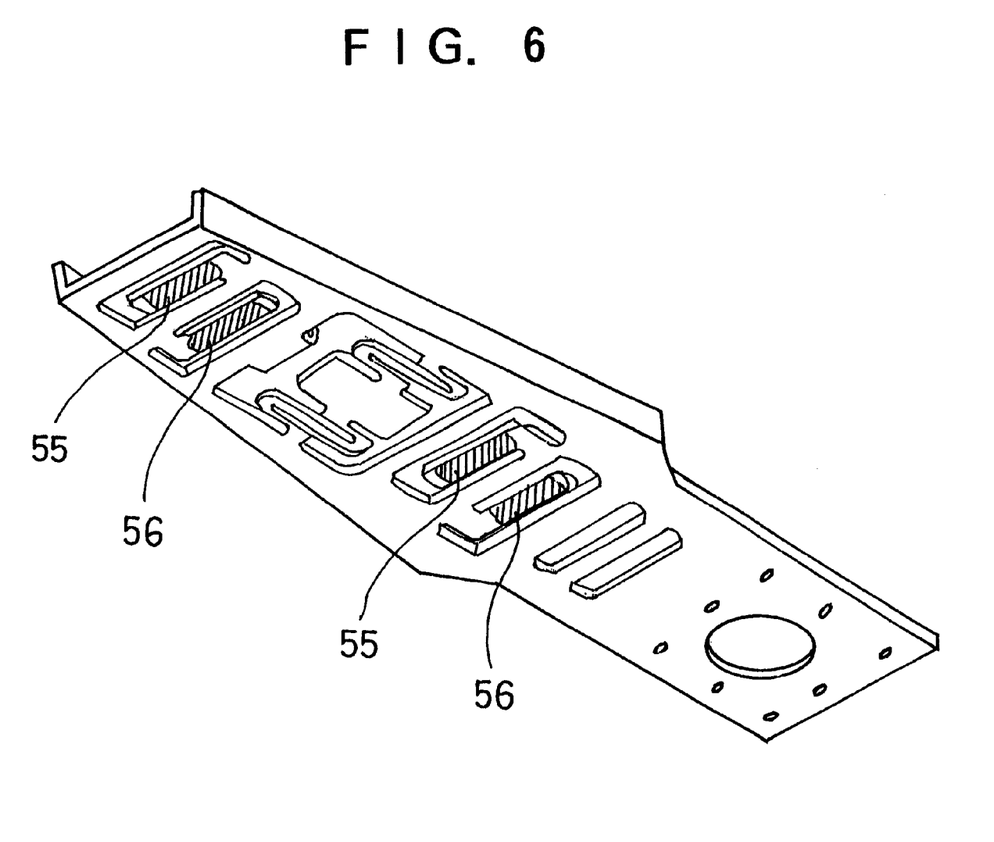
FIG. 6 is a perspective view showing a support member shown in FIG. 2.

The cantilevers 51, 52 is formed utilizing a photofabrication technique such as etching. Furthermore, the cantilevers 51, 52 respectively have piezoelectric elements 55, 56 bonded to an opposite side to the suspension arm 47, as shown in FIG. 6. The piezoelectric elements 55, 56 are of such a material exhibiting characteristics that causes stress or displacement responsive to applied voltage, resonant phenomenon due to applied voltage frequency, and voltage depending upon applied pressure. The piezoelectric elements 55, 56 in this embodiment use thin-filmed lead zirconate titanate that is high in piezoelectric constant. Alternatively, barium titanate, lithium niobate or lead zirconate titanate may be employed. Otherwise, alternatively to these piezoelectric ceramics, functionally graded material or lithium niobate may be used.

The piezoelectric elements 55, 56 are formed by a thin film forming process. This is because of suitability for mass production, and easiness of fabrication due to small-sized cantilevers 51, 52. Incidentally, the cantilever 51, 52 and the piezoelectric element 55, 56 may be formed by adhesion into one body. In such a case, the interface of joining be under conditions that it is very thin and hard, tough, and low in resistance value at around a resonant frequency after adhesion. For example, the adhesive uses a polymer adhesive representative of a hot met and epoxy resins. Incidentally, although the cantilever 51, 52 is of a unimorph type using one-sheet piezoelectric element 55, 56, it may be of a bimorph type using two-sheet piezoelectric elements or a multi-morph type using four or more piezoelectric elements.

The cantilever 51, 52 is not limited in shape to an L-form in plan shown in FIG. 2. For example, the cantilever may be in a shape having a mountain form, projection or bottleneck formed at its tip.

A power source supplies electric power to the piezoelectric elements 55, 56 through interconnections. Also, the seek/following control section 28 controls the supply voltage based on servo signals given from the magnetic head.

Figure 7:
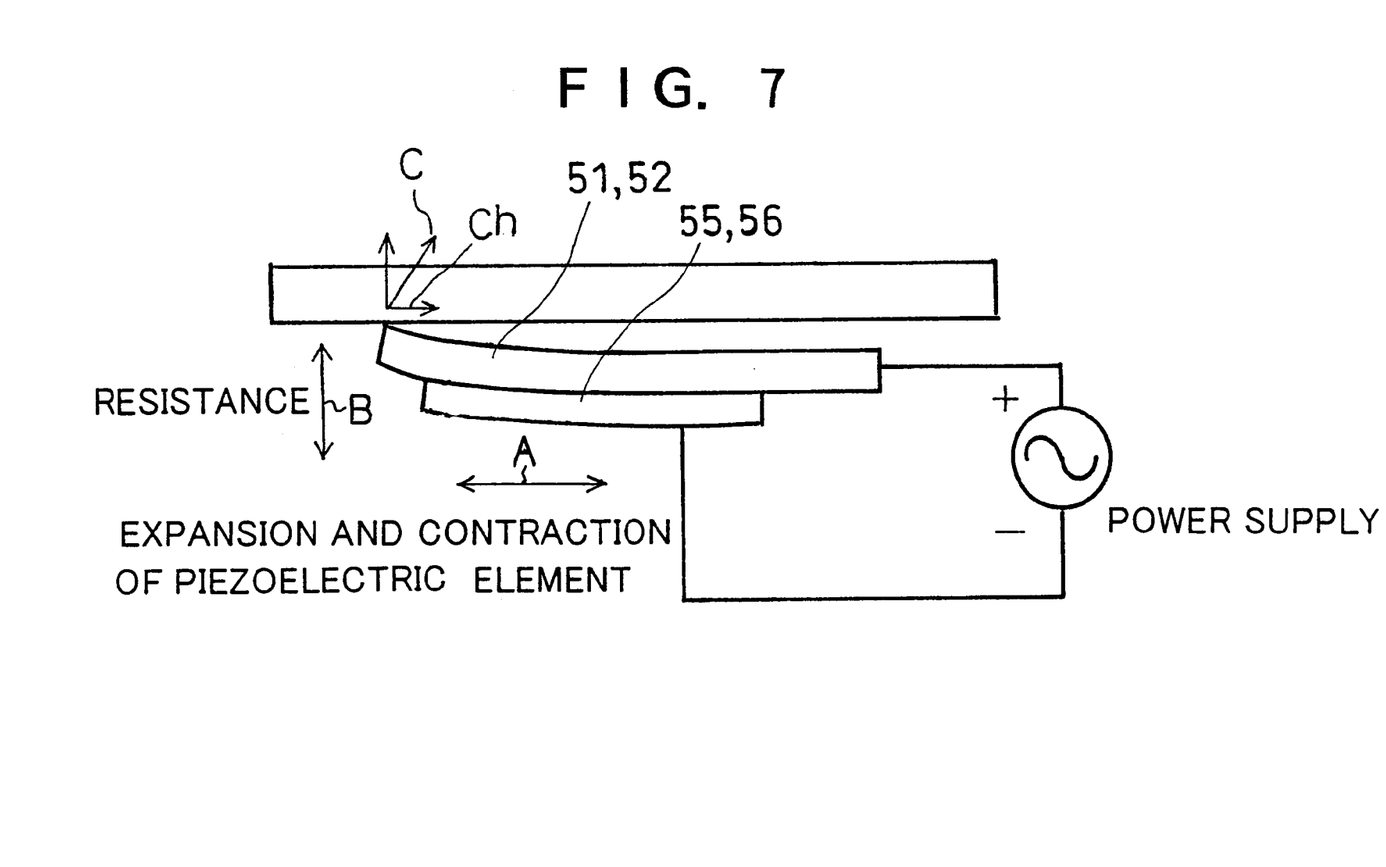
FIG. 7 is an explanatory view showing an operation principle of a single cantilever.

The operation of the magnetic disc apparatus 100 will now be described. First, the operation principle of each cantilever is illustrated in FIG. 7. By applying a particular frequency of drive voltage to the piezoelectric elements 55, 56, the piezoelectric elements 55, 56 expand and contract in the direction of arrow A shown in the figure. This expansion and contraction causes the cantilevers 51, 52 to vibrate in the direction of arrow B shown in the figure. During the vibration, the free ends or tips of the cantilevers 55, 56 contact the slide portion 54 of the suspension arm 47. The direction of contact is not vertical to but inclined with respect to the slide portion 54. Meanwhile, the support member 41 is secured to the carriage 21, while the suspension arm 47 is held by the coupling portion 43. Consequently, the suspension arm 47 is turned by a reaction force to a lateral force component Ch. This causes the magnetic head to slightly move sideways. Meanwhile, the particular frequency is adapted for a characteristic frequency in accordance with the size and shape of the cantilevers 51, 52. This is because the setting at around a resonant frequency provides for maximum amplitude of the cantilevers 51, 52.

Figure 8:
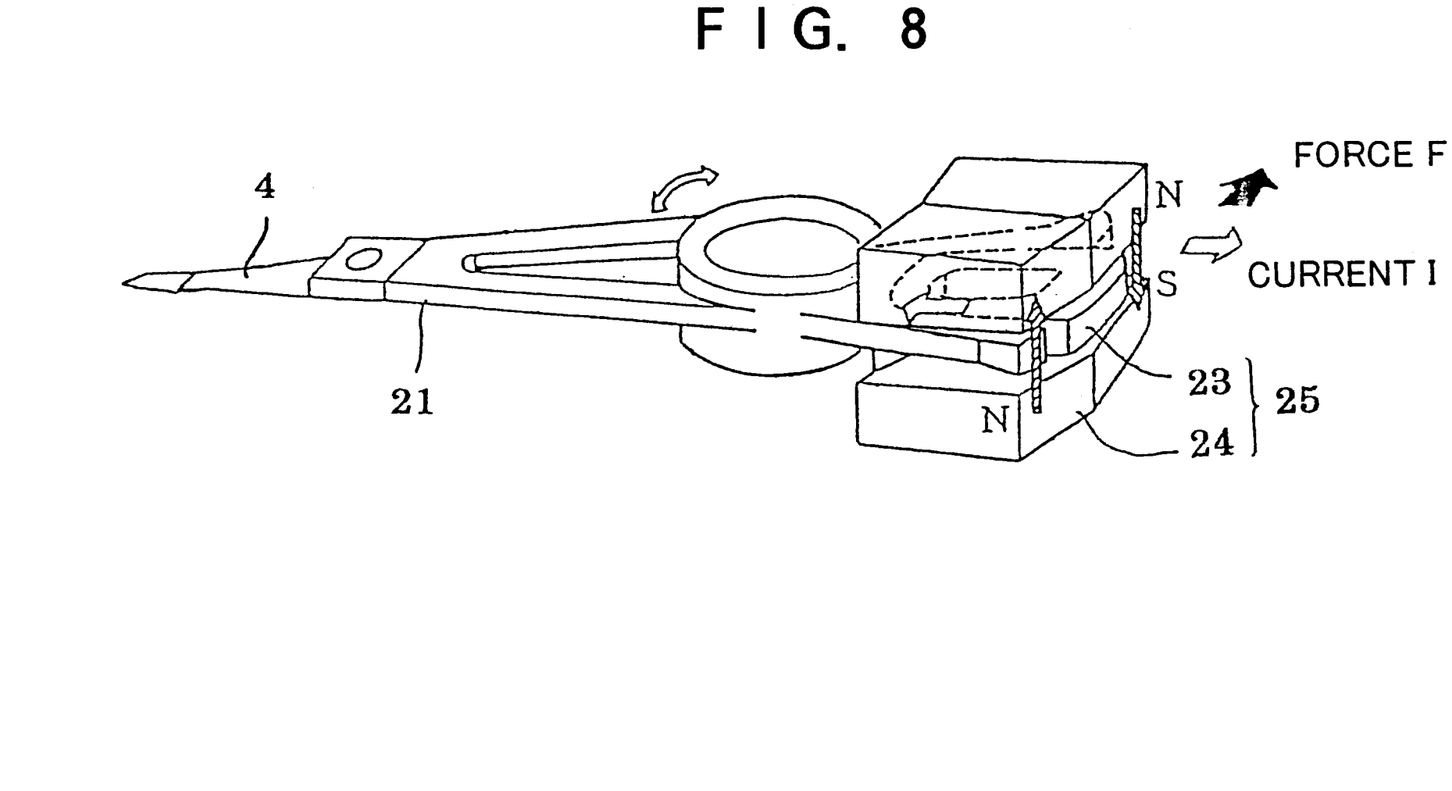
FIG. 8 is an explanatory view showing an operation principle of a voice coil motor.

Now, the operation of the voice coil motor 25 is described. FIG. 8 shows an explanatory view showing an operation principle on the voice coil motor 25. By passing a current through a movable coil (23) in a direction of the arrow I, a force f (arrow F) is caused based on the Flemings left-hand rule. Positioning control is made to a target point on the sub-micron order by controlling the direction and magnitude of electric current to be passed through this movable coil (23).

Figure 9:
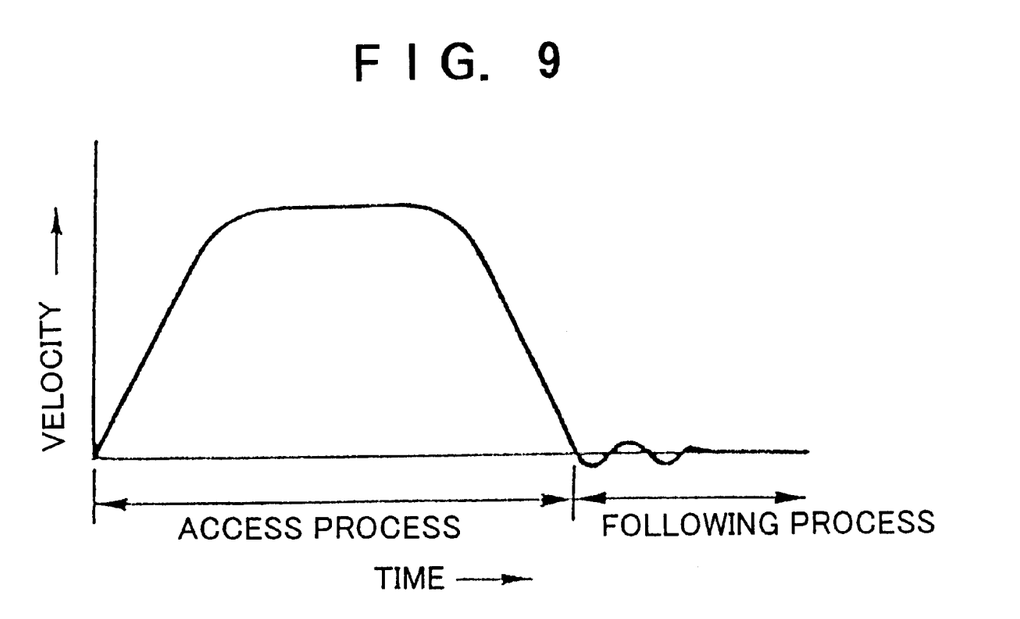
FIG. 9 is a graphical representation showing a relationship between an access motion velocity and a time for the magnetic head.

In positioning control on a magnetic disc apparatus, usually performed are access velocity control (seek control) and follow-up positioning control (following control). In the access velocity control process, the magnetic head is moved at high speed from a current track to a target track. In the follow-up positioning control process, the magnetic head is caused to exactly follow on the track. FIG. 9 is a graphic representation showing a relationship between a magnetic head access movement velocity and a time. In this manner, positioning control is divided in time as access velocity control process and follow-up positioning control process.

Figure 10:
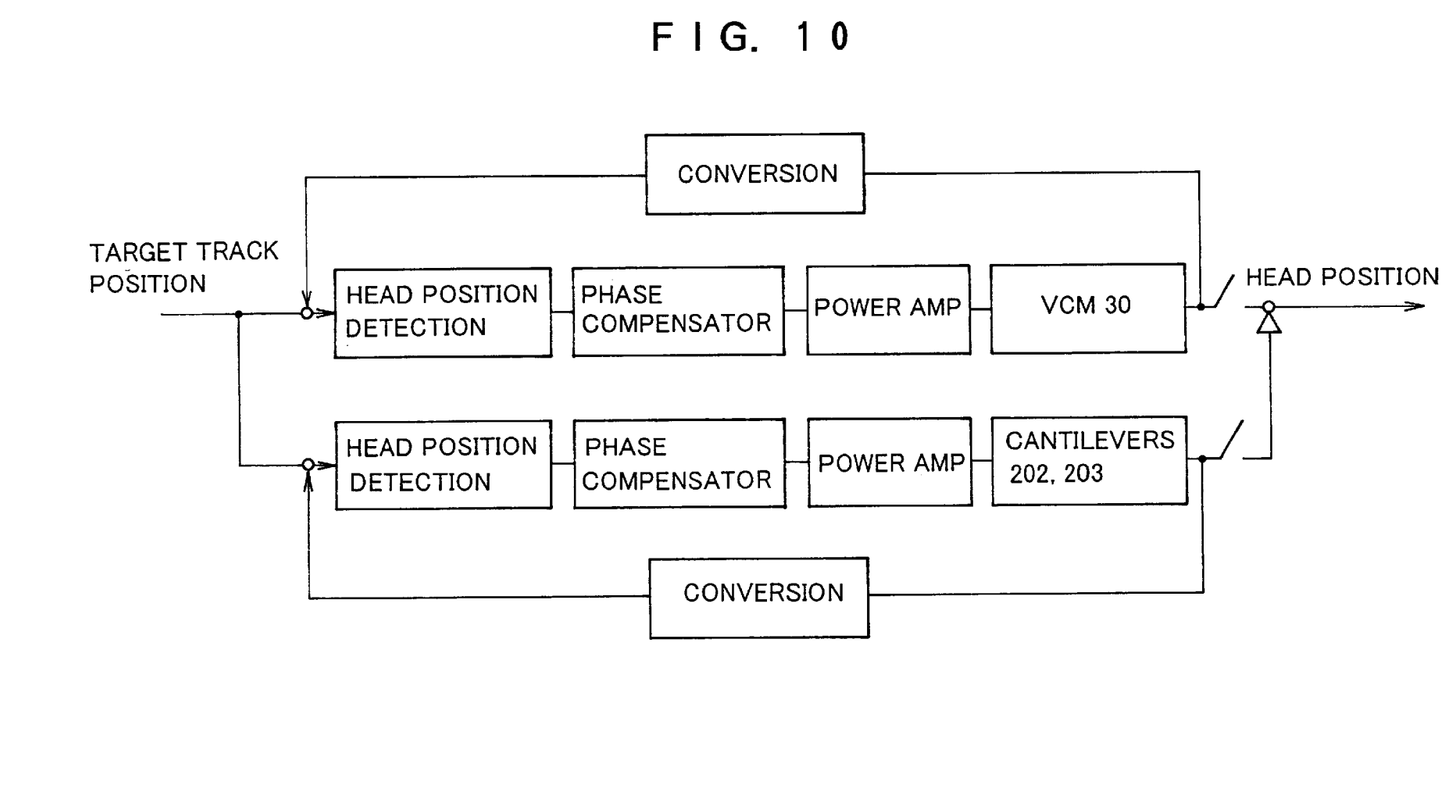
FIG. 10 is a block diagram showing a positioning control system.

This magnetic disc apparatus 100 concurrently performs access velocity control and follow-up positioning control. The access operation is made at high speed by the use of the voice coil motor 25, while the follow-up positioning operation is precisely performed using mainly vibration of the cantilevers 51, 52. FIG. 10 shows a block diagram of a positioning control system. The seek/following control section 28 concurrently performs seek control and following control. In a seek control system, a current head position is first detected and then an operation amount is determined based on a detected head position. A phase compensator controls the phase of a signal on the operation amount. A power amplifier amplifies the phase-controlled operation amount signal. Depending upon the operation amount, the voice coil motor 25 is driven. The control amount in the seek control system is converted into a signal same in kind as a target value signal, and fed back to an input side.

In the following control system, on the other hand, a track error signal is first detected and then an operation amount is determined from the detected track error signal. A phase compensator controls the phase of a signal on the operation amount. A power amplifier amplifies the phase-controlled controlled operation amount signal. Depending on the operation amount in the track error signal, the cantilevers 51, 52 are driven. The control amount in the following control system is converted into a signal same in kind as a target value signal, and fed back to an input side.

Figure 11:
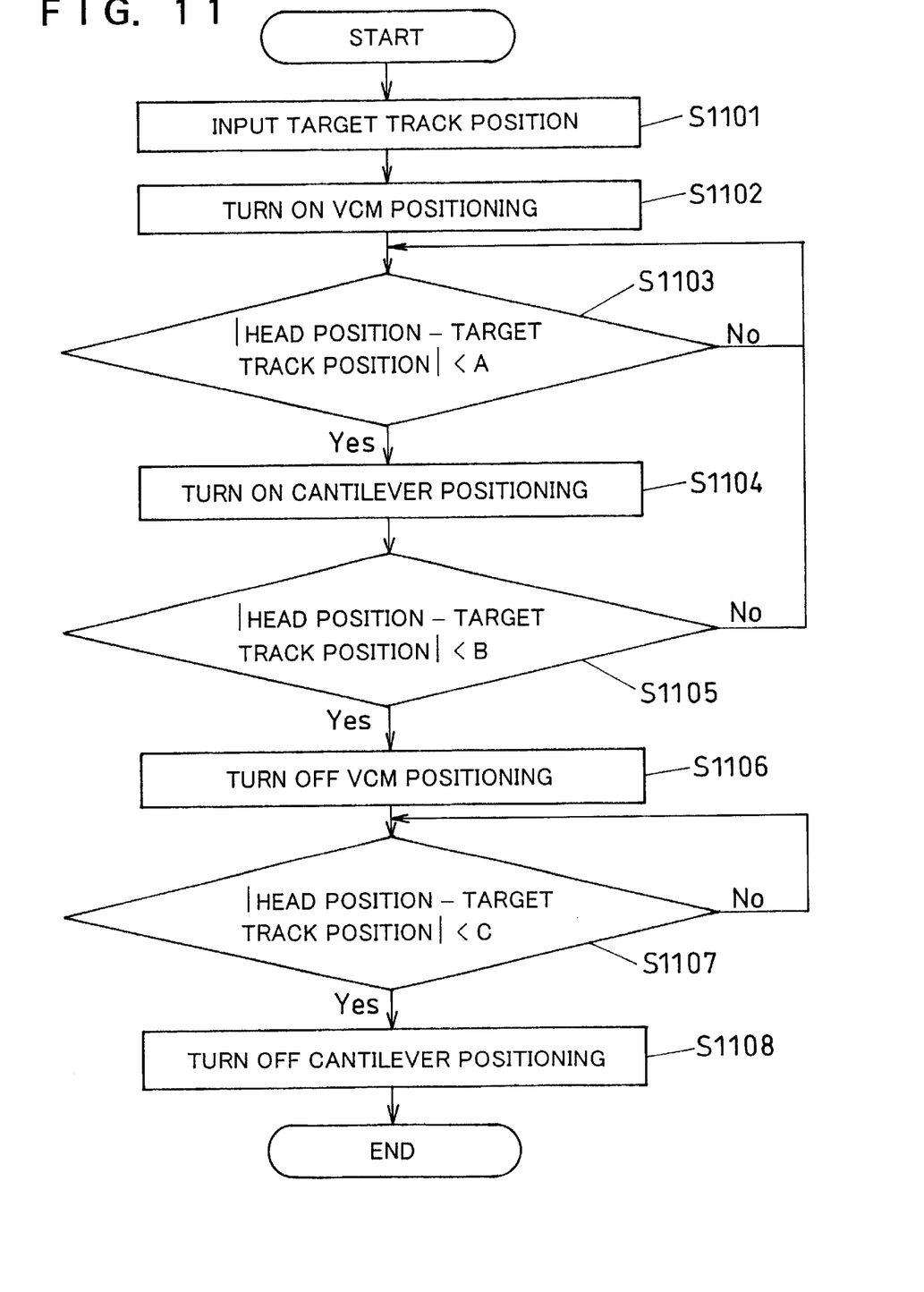
FIG. 11 is a flowchart showing an example of control process by a seek/following control section.

FIG. 11 is a flow chart showing a control process example with the seek/following control section 28. In step S1101, a target track position is inputted. In Step S1102, the positioning control system with the voice coil motor 25 is turned ON, to perform positioning control based on the input target track position data. In step S1103, it is determined whether the difference between the head position and the target track position is less than a movable distance of the cantilevers 51, 52 (a range in which positioning with the cantilever 51, 52 is effective) or not. Positioning control is made by the voice coil motor 25 until the distance becomes less than the movable distance. If it becomes less than the movable distance, the process advances to step S1104.

In the step S1104, the positioning control system with the cantilevers 51, 52 is turned ON. In step S1105, positioning control is made using both the cantilevers 51, 52 and the voice coil motor 25 until the difference between the head position and the target track position becomes less than a width of from one to three tracks. The concurrent use of the voice coil motor 25 is due to inclusion of comparatively large movement such as track-to-track movement. In step S1106, the positioning control system with the voice coil motor 25 is turned OFF, and positioning control is made only by the cantilevers 51, 52. In step S1107, it is determined whether the difference between the head position and the target track position fulfills track positioning accuracy or not. The control is continued until the fulfillment is reached. When fulfilled, the positioning control system for the cantilevers 51, 52 is turned OFF (step S1108).

Incidentally, it is possible to clearly separate the role between the voice coil motor and the cantilevers. That is, the access operation is carried out at high speed by using the voice coil motor 25 while the follow-up positioning operation is exactly made using vibration of the cantilevers 51, 52.

Figure 12:
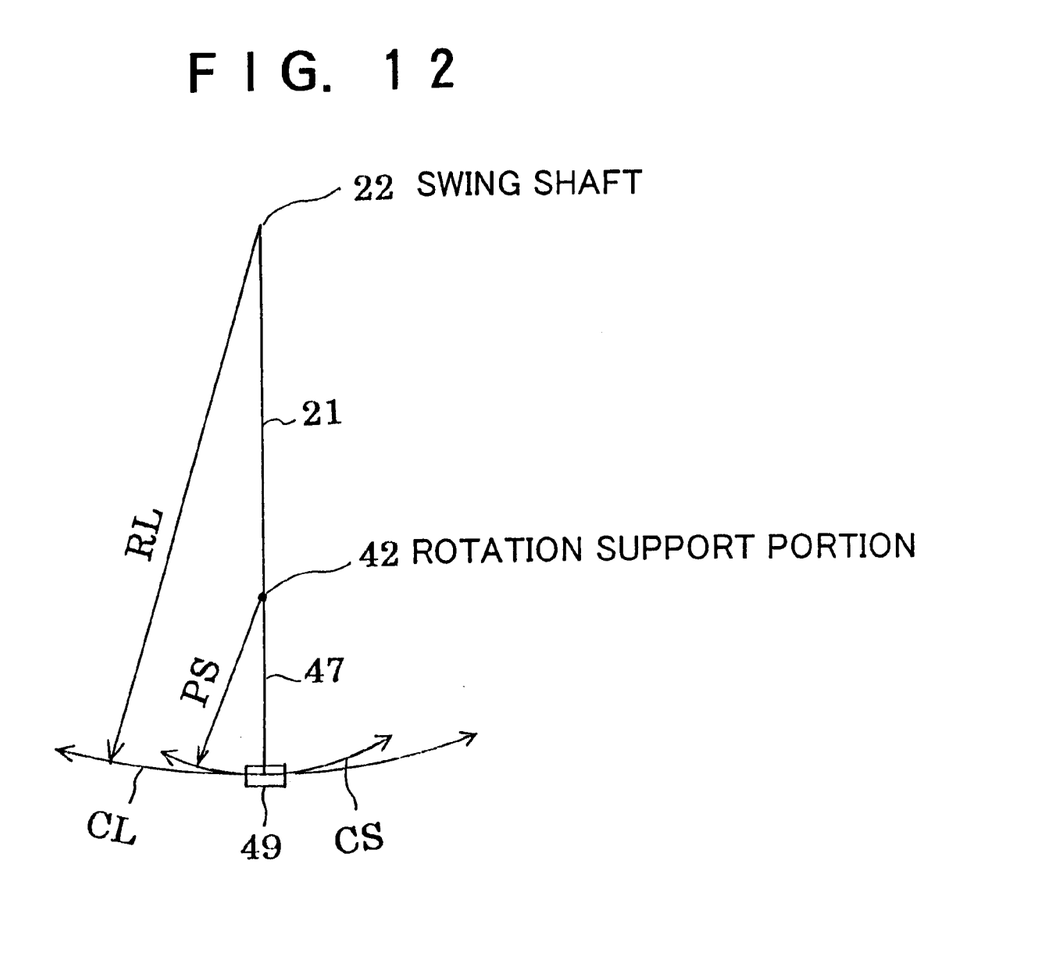
FIG. 12 is an explanatory view showing a magnetic head path.

FIG. 12 shows a path of the magnetic head (shown by slider 49) in positioning the suspension arm 47 by controlling as discussed above. When conducting positioning using the voice coil motor 25, the magnetic head swings with a radius RL about an swing axis (path CL). Meanwhile, where the suspension arm (47) is swung using the fine drive portion 44, the magnetic head swings with a radius RS about the rotation support portion 42 (path CS).

Figure 13A:
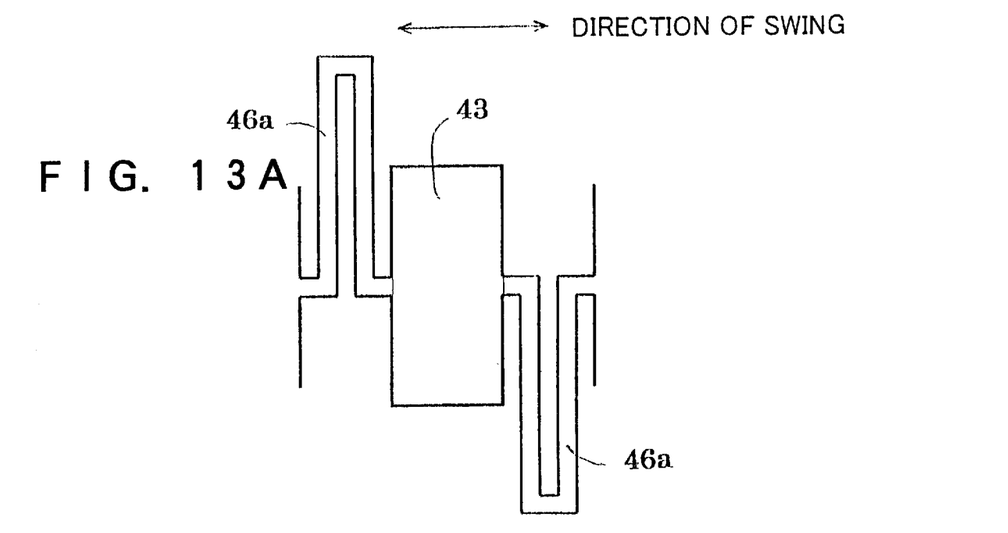
FIGS. 13A, 13B and 13C are top plan views showing modification to the spring portion.
Figure 13B:
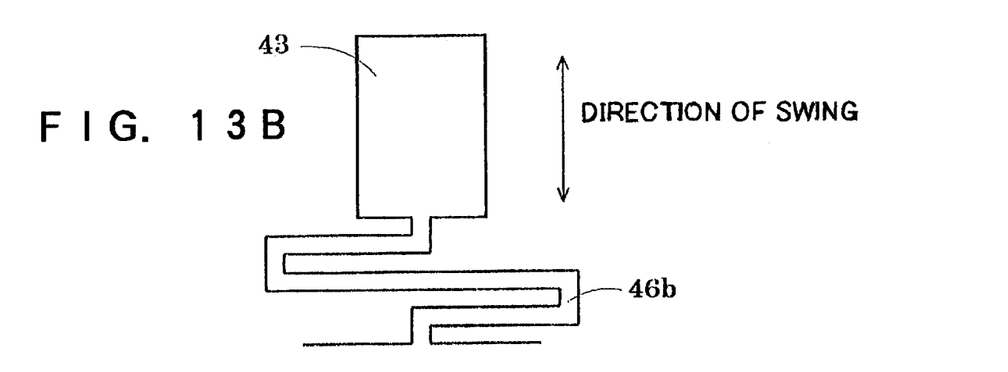
Figure 13C:
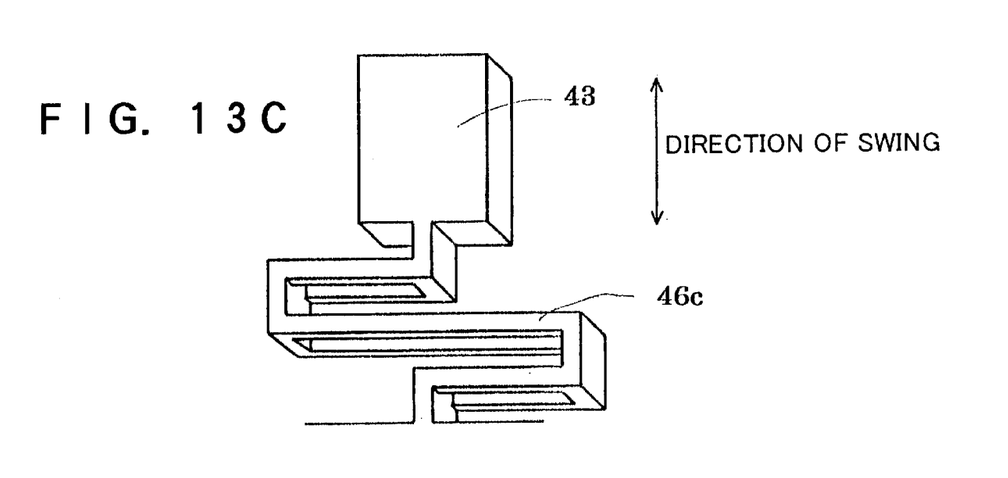

FIG. 13A shows a structural example of the spring portion 46a. FIG. 13A shows a spring portion 46a formed in a squared ⊐ form. FIG. 13B shows a structure having one spring portion 46b to support the coupling portion. FIG. 13C shows a spring portion 46c formed in a hollow structure. The spring portion 46c made in the hollow structure increases the ratio of rigidity in a thickness direction to the rigidity in a suspension swing direction. This can reduce the rigidity that impedes the suspension 47 from performing swing motion while maintaining high contact pressure exerting between the fine drive portion 44 and the suspension 47. Thus, the swing of the suspension 47 can be increased and stabilized. This hollow structure is applicable also to the spring portion 46, 46a of FIG. 2 and FIG. 13A.

As explained above, a first fine drive unit in accordance with the present invention, comprises: a suspension arm for supporting a head portion formed on a slider; a rotation support portion for supporting one portion of the suspension arm and allowing the suspension arm to swing about the support portion; a support member arranged opposite to the suspension arm; a coupling portion provided on the support member and coupled to the suspension arm; a spring portion provided between the support member and the coupling portion; a fine head drive section having bi-directional cantilevers each having one fixed end and the other free end formed on the support member and piezoelectric members respectively provided on the cantilevers. Accordingly the head section can be finely moved.

Also, a second fine drive unit in accordance with the invention, comprises: a support portion formed integrally with a coupling portion in an island form, a spring portion connected to the coupling portion and bi-directional cantilevers each having one fixed end and the other free end, wherein piezoelectric members are provided respectively for the cantilevers, and a rotation support portion being provided to support one portion of the suspension arm to allow the suspension arm to swing about the support portion; a head section formed on a slider to record data to a memory medium and reproduce data recorded in the memory medium; a suspension arm arranged opposite to the support member and supporting the head section. Accordingly, the head section can be finely moved. Also, integral forming reduces the number of parts, being suited for mass production.

Also, a first fine positioning unit in accordance with the invention, comprises: a first fine drive unit; a carriage provided at one end of a support member forming the fine drive unit; a head drive section provided on the carriage to drive the head section by using a magnetic circuit and a coil. Accordingly, the head section can be finely moved over a wide swing range, thus enhancing the accuracy of positioning the head section.

Also, a second fine positioning unit in accordance with the invention, comprises: a second fine drive unit; a carriage provided at one end of a support member forming the fine drive unit; a head drive section provided on the carriage to drive the head section by using a magnetic circuit and a coil. Accordingly, the head section can be moved over a wide swing range, enhancing the accuracy of positioning the head section. Also, the structure is comparatively simple with the number of parts reduced, being suited for mass production.

Also, a first memory apparatus in accordance with the invention, comprises: a first fine drive unit and a recording medium for recording data. Accordingly, seek and following operations can be effected with efficiency.

Also, because fine head movement is possible by the fine head drive section, positioning accuracy is enhanced. Further, there is no need to switch between seek control and following control, it is possible to reduce time loss due to switching over. Also, the movable part (suspension arm) can be reduced in mass and reduced in seek reaction force. From the above, access is possible at high speed and with high resolution. Furthermore, an arm of a piggyback scheme can be structured with comparatively simplified structure, being suited for mass production.

Also, a second memory apparatus in accordance with the invention is integrally formed with a coupling portion of a support portion, a spring portion and a cantilever, wherein the coupling portion is provided with a suspension arm. Accordingly, batch process is feasible with a reduced number of parts. This makes suitable for mass production. Also, by integrally forming the piezoelectric member and the rotation support portion, manufacturing process can be further simplified and mass production is feasible. Also, seek and following operations can be effected with efficiency. Furthermore, because the fine head drive section can provide fine head section movement, positioning accuracy is improved. Also, there is no need to switch between seek control and following control, it is possible to reduce time loss due to switch over. Also, the movable part (suspension arm) can be suppressed in mass and reduced in seek reaction force. From the above, access can be realized at high speed and with high accuracy.

What is claimed is:

1. A fine drive unit comprising: a suspension arm for supporting a slider having a head portion; a rotation support for supporting a portion of the suspension arm and allowing the suspension arm to undergo pivotal movement about the rotation support; a support member disposed opposite to the suspension arm; a coupling disposed on the support member and connected to the suspension arm; a spring disposed between the support member and the coupling; and a fine head drive section having bi-directional cantilevers and piezoelectric members each disposed on a respective one of the cantilevers, each of the cantilevers having a free end and an end opposite the free end and connected to the support member; wherein when a voltage having a preselected frequency is applied to the piezoelectric members, the cantilevers are vibrated to cause the cantilevers to contact the suspension arm and thereby finely drive the head portion.

2. A fine positioning unit comprising: a fine drive unit according to claim 1; a carriage disposed at one end of the support member of the fine drive unit; and a drive section disposed on the carriage and having a magnetic circuit and a coil for driving the fine head drive section; wherein the head portion is finely positioned by operation of the fine drive unit and the drive section.

3. A memory apparatus comprising: a fine drive unit according to claim 1; and a recording medium for recording data; wherein data recorded in the recording medium is recorded and reproduced through the head portion of the fine drive unit.

4. A fine drive unit comprising: a suspension arm; a support member disposed opposite to the suspension arm and having a coupling portion connected to the suspension arm, a spring portion connected to the coupling portion, bi-directional cantilevers each having a free end and an end opposite the free end and connected to the support member, piezoelectric members each disposed on a respective one of the cantilevers, and a rotation support portion for supporting one portion of the suspension arm to allow the suspension arm to undergo pivotal movement about the support portion; and a slider supported by the suspension arm and having a head section for recording data on a recording medium and for reproducing data recorded on the recording medium; wherein when a voltage having a preselected frequency is applied to the piezoelectric members, the cantilevers are vibrated to cause the cantilevers to contact the suspension arm and thereby finely drive the head section.

5. A fine positioning unit comprising: a fine drive unit according to claim 4; a carriage disposed at one end of the support member of the fine drive unit; and a head drive section disposed on the carriage and having a magnetic circuit and a coil for driving the head section of the fine drive unit; wherein the head section is finely positioned by operation of the fine drive unit and the head drive section.

6. A memory apparatus comprising: a fine positioning unit according to claim 5; and a recording medium for recording data; wherein data recorded in the recording medium recorded and reproduced through the head section of the fine drive unit.

7. A fine drive unit comprising: a suspension arm having a head portion; and a support member supporting the suspension arm for undergoing pivotal movement, the support member having at least one pair of cantilevers for undergoing vibrational movement to cause end of each of the cantilevers to contact the supension arm to pivot the suspension arm and thereby finely drive the head portion thereof.

8. A fine drive unit according to claim 7; wherein the head portion of the suspension arm comprises a magnetic head.

9. A fine drive unit according to claim 7; further comprising a pair of piezoelectric members each disposed on a respective one of the cantilevers for undergoing contraction and expansion movement to vibrationally drive the cantilevers.

10. A fine drive unit according to claim 9; further comprising means for applying a voltage having a preselected frequency to the piezoelectric members to undergo expansion and contraction movement.

11. A fine drive unit according to claim 7; wherein the support member has a coupling portion connected to the suspension arm and at least one spring portion connected to the coupling portion.

12. A fine drive unit comprising: a suspension arm having a head portion; a support member supporting the suspension arm for undergoing pivotal movement; a first pair of cantilevers connected to the support member; a second pair of cantilevers connected to the support member; a plurality of piezoelectric members each disposed on a respective one of the cantilevers of the first and second pairs of cantilevers; and means for applying a voltage having a preselected frequency to each of the piezoelectric members to cause the piezoelectric members to undergo expansion and contraction movement to vibrationally drive the first and second pairs of cantilevers to cause a free end of each of the cantilevers to contact the suspension arm to pivot the suspension arm and thereby finely drive the head portion of the suspension arm.

13. A fine drive unit according to claim 12; wherein the head portion of the suspension arm comprises a magnetic head.

14. A fine drive unit according to claim 12; wherein the support member has a coupling portion connected to the suspension arm and a pair of spring portions connected to opposite sides of the coupling portion.

\* \* \* \* \*